(12) United States Patent
Gross (10) Patent No.: US 10,855,467 B2
(45) Date of Patent: Dec. 1, 2020

(54) DETECTING VULNERABLE ENCRYPTION KEYS IN NETWORK COMMUNICATION SYSTEMS

(71) Applicant: NOBLIS, INC., Reston, VA (US)

(72) Inventor: Samuel S. Gross, Manassas, VA (US)

(73) Assignee: NOBLIS, INC., Reston, VA (US)

( * ) Notice: Subject to any disclaimer, the term of this patent is extended or adjusted under 35 U.S.C. 154(b) by 233 days.

(21) Appl. No.: 15/980,965

(22) Filed: May 16, 2018

(65) Prior Publication Data

US 2019/0149331 A1 May 16, 2019

Related U.S. Application Data

(60) Provisional application No. 62/507,630, filed on May 17, 2017.

(51) Int. Cl.
*H04L 9/30* (2006.01)
*H04L 9/08* (2006.01)
*H04L 9/00* (2006.01)

(52) U.S. Cl.
CPC .............. *H04L 9/302* (2013.01); *H04L 9/002* (2013.01); *H04L 9/0869* (2013.01); *H04L 9/0894* (2013.01); *H04L 2209/26* (2013.01)

(58) Field of Classification Search
CPC ....... H04L 9/302; H04L 9/002; H04L 9/0869; H04L 9/0894; H04L 2209/26
See application file for complete search history.

(56) References Cited

U.S. PATENT DOCUMENTS

| 5,956,407 A | * | 9/1999 | Slavin | H04L 9/302 380/30 |
| 7,123,717 B1 | * | 10/2006 | Coron | H04L 9/003 380/28 |
| 7,522,723 B1 | * | 4/2009 | Shaik | H04L 9/302 380/282 |

(Continued)

OTHER PUBLICATIONS

Heninger et al. "Mining Your Ps and Qs: Detection of Widespread Weak Keys in Network Devices", 2012, 21 pages. (Year: 2012).*

(Continued)

*Primary Examiner* — Yonas A Bayou
(74) *Attorney, Agent, or Firm* — Morrison & Foerster LLP (57) ABSTRACT

Techniques for determining whether a public encryption key is vulnerable as the result of deficiencies in pseudorandom number generation algorithms are provided. In some embodiments, a system may compile a database of cryptographic information received from a plurality of sources, including databases, and network traffic monitoring tools. RSA public keys extracted from the cryptographic information may be stored in an organized database in association with corresponding metadata. The system may construct a product tree from all unique collected RSA keys, and may then construct a remainder tree from the product tree, wherein each output remainder may be determined to be a greatest common divisor of one of the RSA keys against all other unique RSA keys in the database. The system may then use the greatest common divisors to factor one or more of the RSA keys and to determine that the factored keys are vulnerable to being compromised.

18 Claims, 2 Drawing Sheets

(56) References Cited

U.S. PATENT DOCUMENTS

| | | | | |
|---|---|---|---|---|
| 2002/0032853 | A1* | 3/2002 | Preston | H04L 63/18 |
| | | | | 713/151 |
| 2003/0099360 | A1* | 5/2003 | Hoang | H04L 9/302 |
| | | | | 380/277 |
| 2006/0029224 | A1* | 2/2006 | Baek | H04L 9/004 |
| | | | | 380/30 |
| 2008/0148067 | A1* | 6/2008 | Sitrick | H04L 9/0891 |
| | | | | 713/193 |
| 2012/0257758 | A1* | 10/2012 | Vanstone | H04L 9/0841 |
| | | | | 380/282 |
| 2015/0071441 | A1* | 3/2015 | Hinz | H04L 9/0869 |
| | | | | 380/270 |

OTHER PUBLICATIONS

Bernstein. (2004) "How to Find Smooth Parts of Integers," located at <http://cr.yp.to/factorization/smoothparts-20040510.pdf>, visited on Sep. 25, 2018. (7 pages).

Dodis et al. "Security Analysis of Pseudo-Random Number Generators with Input: /dev/random is not Robust," Proceedings of the 2013 ACM SIGSAC conference on Computer & Communications Security, Nov. 4-8, 2013, Berlin, Germany, 31 pages.

Heffner et al. "LittleBlackBox: Database of private SSL/SSH keys for embedded devices," located at <http://code.google.com/p/littleblackbox>, visited on Sep. 25, 2018. (2 pages).

Heninger et al. "Mining your P's and Q's: Detection of Widespread Weak Keys in Network Devices," Proceedings of the 21st USENIX Security Symposium, Aug. 6-10, 2012, Bellevue, Washington, 21 pages.

\* cited by examiner

FIG. 1

FIG. 2

DETECTING VULNERABLE ENCRYPTION KEYS IN NETWORK COMMUNICATION SYSTEMS

REFERENCE TO RELATED APPLICATIONS

This application claims the benefit of U.S. Provisional Application No. 62/507,630, entitled, "DETECTING VULNERABLE ENCRYPTION KEYS IN NETWORK COMMUNICATION SYSTEMS," filed May 17, 2017, the entire contents of which are incorporated herein by reference.

FIELD OF THE INVENTION

This relates generally to secure encryption, and more specifically, to determining whether a public key is vulnerable as the result of deficiencies in pseudorandom number generation algorithms or the processes by which said algorithms are implemented.

BACKGROUND OF THE INVENTION

Random number generation is a fundamental aspect in many cryptographic processes such as producing encryption keys, initialization vectors, salts for hashing passwords, nonces for various protocols, and digital signatures. In an informal sense, a random number generator is a function whose range exhibits a uniform distribution. Since truly random number generation is only possible in theory, computers use pseudorandom number generators, which are functions whose range is deterministic but close to uniformly distributed. The concept of entropy may then be used as a qualitative characterization of how close to uniform the range is. For example, processes such as reading thermal noise, or the precise timing of Geiger counter clicks have high levels of entropy, while querying the internal states of a machine generally have very low levels of entropy. Therefore, the task of any good pseudorandom number generator is to collect data from various low entropy input streams and transform this into a set that is in practice indistinguishable from random.

A large scale network survey of 23 million TLS and SSH servers on the internet identified several possible implementation flaws in RSA and DSA key generation. The authors were able to compute private keys for 64,000 TLS hosts and 108,000 for SSH hosts, representing a combined 1.56% of hosts scanned in the study. For example, RSA keys of 1024 bits were easily factored by identifying two distinct RSA keys that share a single prime factor. See Nadia Heninger, Zakir Durumeric, Eric Wutrow, and J. Alex Halderman. Mining your P's and Q's: Detection of Widespread Weak Keys in Network Devices. *Proc. 21st USENIX Security Symposium*, August 2012.

Many headless or embedded systems have been identified as particularly vulnerable due to using manufacturer default keys that may be left unchanged by the end user, or due to generating keys during first boot when an entropy pool is not strong enough to produce unique keys. The former of these issues is easily detectable by comparing a given device's keys against an online database of known default keys (see, e.g., Heffner, C. et al. LittleBlackBox: Database of private SSL/SSH keys for embedded devices. http://code.google.com/p/littleblackbox). Devices suffering from this flaw may include routers, server management devises, network storage, remote access devices, and VoIP devices.

The issue of key generation during periods of low entropy may, however, be a cause for greater alarm. The existence of duplicate keys or, even worse, RSA public keys with a single common prime factor, is an indication that keys are being generated using insufficient entropy. Devices from 41 manufacturers; including Juniper Networks Branch SRX, IBM Remote Server Administration Cards, and BladeCenter Management Modules are known to generate factorable RSA keys or other failures in pseudorandom number generation. In particular, a survey of 576 IBM Remote Server Administration Cards and BladeCenter Management Modules showed only 9 distinct primes used to generate all public RSA keys. Similar phenomena have been observed with default keys served by Citrix remote access servers. Among these signed certificates with duplicate keys were found to belong to Fortune 500 companies, insurance providers, law firms, a major public transit authority, and the U.S. Navy.

In addition to generating keys during a period of low entropy, the method by which the machine monitors the entropy pool may be compromised and exploited to create a side-channel attack. See Yevgeniy Dodis, et al. Security Analysis of Pseudo-Random Number Generators with Input: /dev/random is not Robust. Proceedings of the 2013 ACM SIGSAC conference on Computer & communications security. November 2013.

Thus, current methods for generation of encryption keys, digital signatures, and other cryptographic data structures include several known vulnerabilities and are subject to potential exploitation. As the body of cryptographic data on the internet continues to grow, the task of determining whether cryptographic keys are vulnerable to this type of exploitation may become increasingly burdensome. For example, the current body of public encryption keys available for download from Censys.io is about 1 TB in size, representing keys taken from the publicly-available internet; however, it is estimated that in three years the body of public keys readily available on the public internet will grow to about 4 TB in size.

SUMMARY OF THE INVENTION

As described above, known methods for generation of encryption keys, digital signatures, and other cryptographic data structures include several known vulnerabilities and are subject to potential exploitation. Furthermore, the body of readily-available public keys on the public internet is rapidly expanding, such that known methods for determining whether a specific public key or a body of public keys are vulnerable to exploitation may become increasingly computationally burdensome in light of the growing body of publicly available keys.

Thus, there is a need for improved systems, methods, and techniques for determining whether encryption keys are vulnerable to being compromised in light of a large corpus of encryption data; these systems, methods, and techniques should be capable of quickly, accurately, and efficiently processing the large body of encryption keys currently publicly available, as well as scalably and efficiently incorporating new data, including both individual data points and large batches of additional data.

Described herein are systems, methods, and techniques that address these needs. In some embodiments, a system is provided that may receive encryption key data and associated metadata from the public internet, from one or more private networks, and from network traffic monitoring. In some embodiments, RSA public keys may be extracted and stored along with associated metadata regarding the source of the encryption keys. The RSA public keys may be hashed to identify duplicate keys. In some embodiments, unique RSA public keys may then be used to create a product tree. The product tree and the body of unique keys may then be used to generate a remainder tree, and the data output by the remainder tree may include, for each encryption key used to build the product tree, the greatest common divisor of that key against the other encryption keys in the body of unique keys. These greatest common divisors may then be used to fully factor all keys for which one or more prime numbers is output as a greatest common divisor of the key. For keys for which prime factors can be calculated, an alert may be generated and transmitted to indicate that the key is vulnerable to being compromised.

As explained here, the system may further efficiently incorporate additional key data by performing individual calculations to calculate greatest common divisors when a small amount of additional RSA public keys is received (e.g., when one or a handful of new keys are stripped from network traffic), but may nonetheless update the product tree with each new key received. However, if an additional amount of data above a predefined threshold is received, then the system may update the product tree and perform the remainder tree calculation based on the new product tree, which may be more computationally efficient than calculating each key's greatest common divisor individually against the entire data set. Thus, the system may be configured to selectively use a batch compare methodology in order to maximize efficiency.

In some embodiments, digital signatures may be extracted from the received encryption key data, and may be stored along with associated metadata. Collisions between digital signatures using the same random number may be detected, and the random number may be computed. Based on the random number, the private signing key of both digital signatures may be computed and validated, thus determining that the private signing key is vulnerable to being compromised.

In some embodiments, a system for determining whether an encryption key is vulnerable to being compromised is provided, the system comprising: one or more processors communicatively coupled to a one or more data sources configured to provide cryptographic data; a memory storing one or more programs, the one or more programs configured to be executed by the one or more processors and including instructions to: receive the cryptographic data, wherein the cryptographic data comprises a public encryption key; and in response to receiving the cryptographic data: extract and store the public encryption key along with associated metadata in a database; determine a greatest common divisor of the extracted public encryption key against all other encryption keys in a plurality of unique encryption keys stored in the database; in accordance with the determined greatest common divisor of the extracted public encryption key, determine that the extracted public encryption key is vulnerable to being compromised in accordance with any one of the other encryption keys in the plurality of unique encryption keys stored in the database; and in accordance with a determination that the extracted public encryption key is vulnerable to being compromised, generate and transmit an alert indicating that the extracted public encryption key is vulnerable to being compromised.

In some embodiments of the method, determining the greatest common divisor of the extracted public encryption key comprises: if a set of one or more predefined conditions is determined to be satisfied, individually comparing the extracted public encryption key against each of the other encryption keys in the plurality of unique encryption keys to determine a respective greatest common divisor of the extracted public encryption key for each of the other encryption keys in the plurality of unique encryption keys; and if the set of one or more predefined conditions is determined not to be satisfied, generating and storing a product tree based on the plurality of unique encryption keys, and generating and storing a remainder tree based on the product tree, to determine the greatest common divisor of the extracted public encryption key against the entire plurality of unique encryption keys.

In some embodiments of the system, each of a plurality of remainders output from the remainder tree is a greatest common divisor of one of the unique encryption keys against the entire plurality of unique encryption keys.

In some embodiments of the system, the set of one or more predefined conditions comprises that the cryptographic data is received from a predetermined source.

In some embodiments of the system, the set of one or more predefined conditions comprises that the cryptographic data received comprises less than a predefined threshold number of unique public encryption keys that are not already stored in the database.

In some embodiments of the system, determining that the extracted public encryption key is vulnerable to being compromised comprises factoring the extracted public encryption key into two prime factors, wherein one of the prime factors is the determined greatest common divisor and is also a factor of at least one of the other encryption keys in the plurality of unique encryption keys stored in the database.

In some embodiments of the system, the other of the prime factors is also a factor of at least one of the other encryption keys in the plurality of unique encryption keys stored in the database.

In some embodiments of the system, the one or more programs include instructions to store the two prime factors in the database in association with the extracted public encryption key.

In some embodiments of the system, the one or more programs include instructions to store one of the prime factors in the database in association with one or more other encryption keys that are factorable by the prime factor.

In some embodiments of the system, the one or more programs include instructions to store the other of the prime factors in the database in association with one or more other encryption keys that are factorable by the other of the prime factors.

In some embodiments of the system, the alert is transmitted in accordance with the metadata stored in association with the extracted public encryption key.

In some embodiments of the system, the one or more programs include instructions to, in accordance with the determination that the extracted public encryption key is vulnerable to being compromised, generate and transmit a second alert indicating that one of the other encryption keys in the plurality of unique encryption keys is vulnerable to being compromised, wherein the second alert is transmitted in accordance with metadata stored in association with the other encryption key.

In some embodiments of the system, the one or more data sources communicatively coupled with the one or more processors comprise a database of public encryption keys gathered from a public network.

In some embodiments of the system, the one or more data sources communicatively coupled with the one or more processors comprise a database of public encryption keys gathered from a private network In some embodiments of the system, the one or more data sources communicatively coupled with the one or more processors comprise a tool configured to extract public encryption keys from monitored network traffic in response to the traffic being detected by the tool.

In some embodiments of the system, the extracted public encryption keys and the unique public encryption keys stored in the database comprise RSA public keys.

In some embodiments, a method for determining whether an encryption key is vulnerable to being compromised, the method comprising: at a system comprising one or more processors communicatively coupled to a one or more data sources configured to provide cryptographic data: receiving the cryptographic data, wherein the cryptographic data comprises a public encryption key; and in response to receiving the cryptographic data: extracting and store the public encryption key along with associated metadata in a database; determining a greatest common divisor of the extracted public encryption key against all other encryption keys in a plurality of unique encryption keys stored in the database; in accordance with the determined greatest common divisor of the extracted public encryption key, determining that the extracted public encryption key is vulnerable to being compromised in accordance with any one of the other encryption keys in the plurality of unique encryption keys stored in the database; and in accordance with a determination that the extracted public encryption key is vulnerable to being compromised, generating and transmitting an alert indicating that the extracted public encryption key is vulnerable to being compromised.

In some embodiments, a non-transitory computer-readable storage medium storing one or more programs for determining whether an encryption key is vulnerable to being compromised is provided, the one or more programs configured to be executed by one or more processors communicatively coupled to a one or more data sources configured to provide cryptographic data, the one or more programs including instructions to: receive the cryptographic data, wherein the cryptographic data comprises a public encryption key; and in response to receiving the cryptographic data: extract and store the public encryption key along with associated metadata in a database; determine a greatest common divisor of the extracted public encryption key against all other encryption keys in a plurality of unique encryption keys stored in the database; in accordance with the determined greatest common divisor of the extracted public encryption key, determine that the extracted public encryption key is vulnerable to being compromised in accordance with any one of the other encryption keys in the plurality of unique encryption keys stored in the database; and in accordance with a determination that the extracted public encryption key is vulnerable to being compromised, generate and transmit an alert indicating that the extracted public encryption key is vulnerable to being compromised.

Any of the features of any of the embodiments listed above or elsewhere herein may be combined with one another.

DETAILED DESCRIPTION OF THE INVENTION

The following description sets forth exemplary methods, parameters, and the like. It should be recognized, however, that such description is not intended as a limitation on the scope of the present disclosure but is instead provided as a description of exemplary embodiments.

Traditional techniques for determining whether encryption keys, digital signatures, or the like are vulnerable to exploitation have required either (a) assuming that random number generation systems are without substantial fault or (b) performing computationally intractable amounts of calculations against all known encryption keys. As explained above, in light of the many known faults of random number generation systems and in light of the exponentially increasing body of publicly available encryption keys, more computationally efficient techniques are needed for determining whether an encryption key is vulnerable to being compromised.

The systems, methods, and techniques disclosed herein may address this need by using a batch-comparison technique to build and update a product tree using RSA public key data and to calculate a remainder tree using the product tree, and to thereby efficiently update a database to track which publicly available RSA keys are vulnerable to being factored and exploited in light of at least one other publicly available encryption key.

Figure 1:
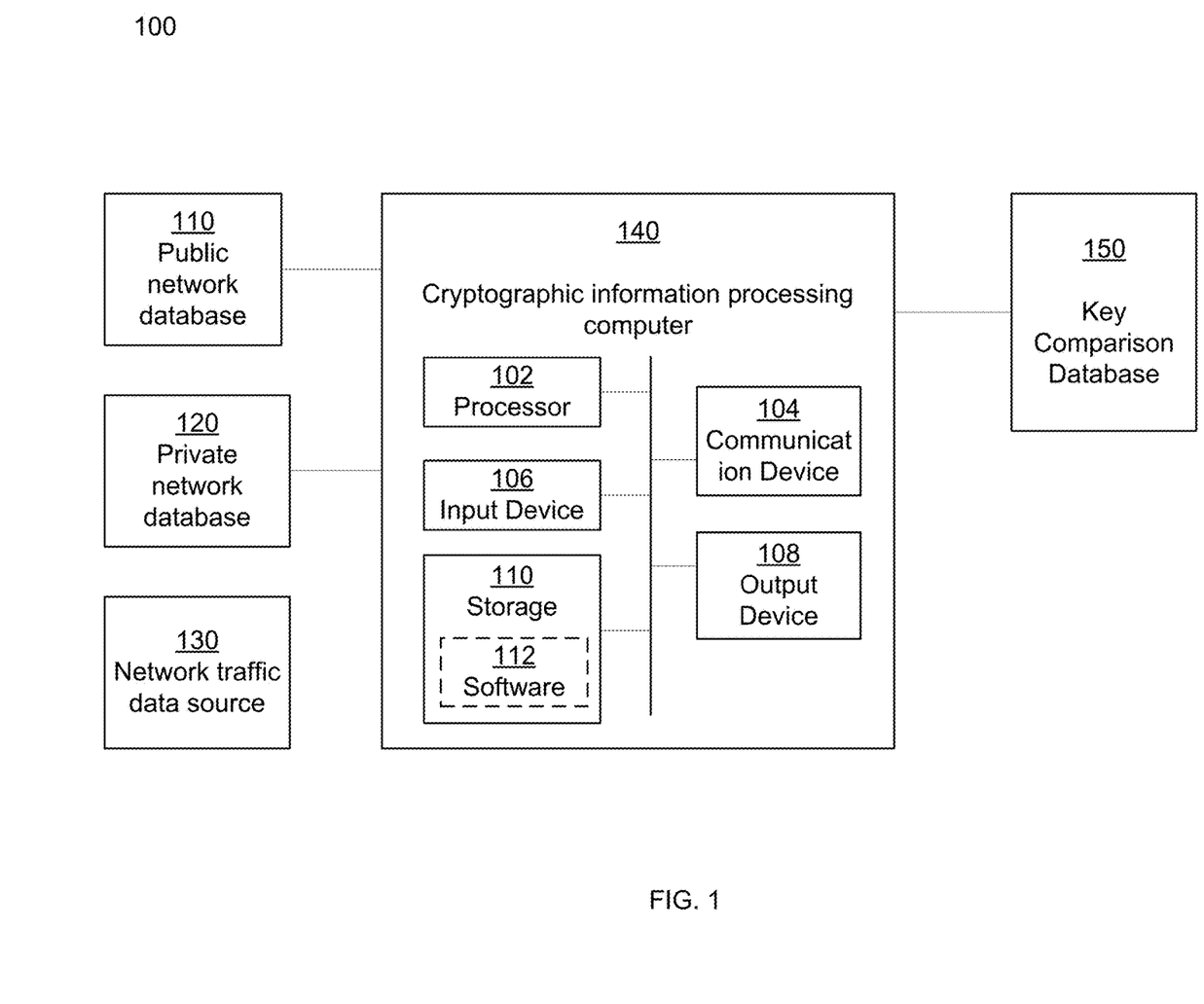
FIG. 1 shows a computer system in accordance with some embodiments.
Figure 2:
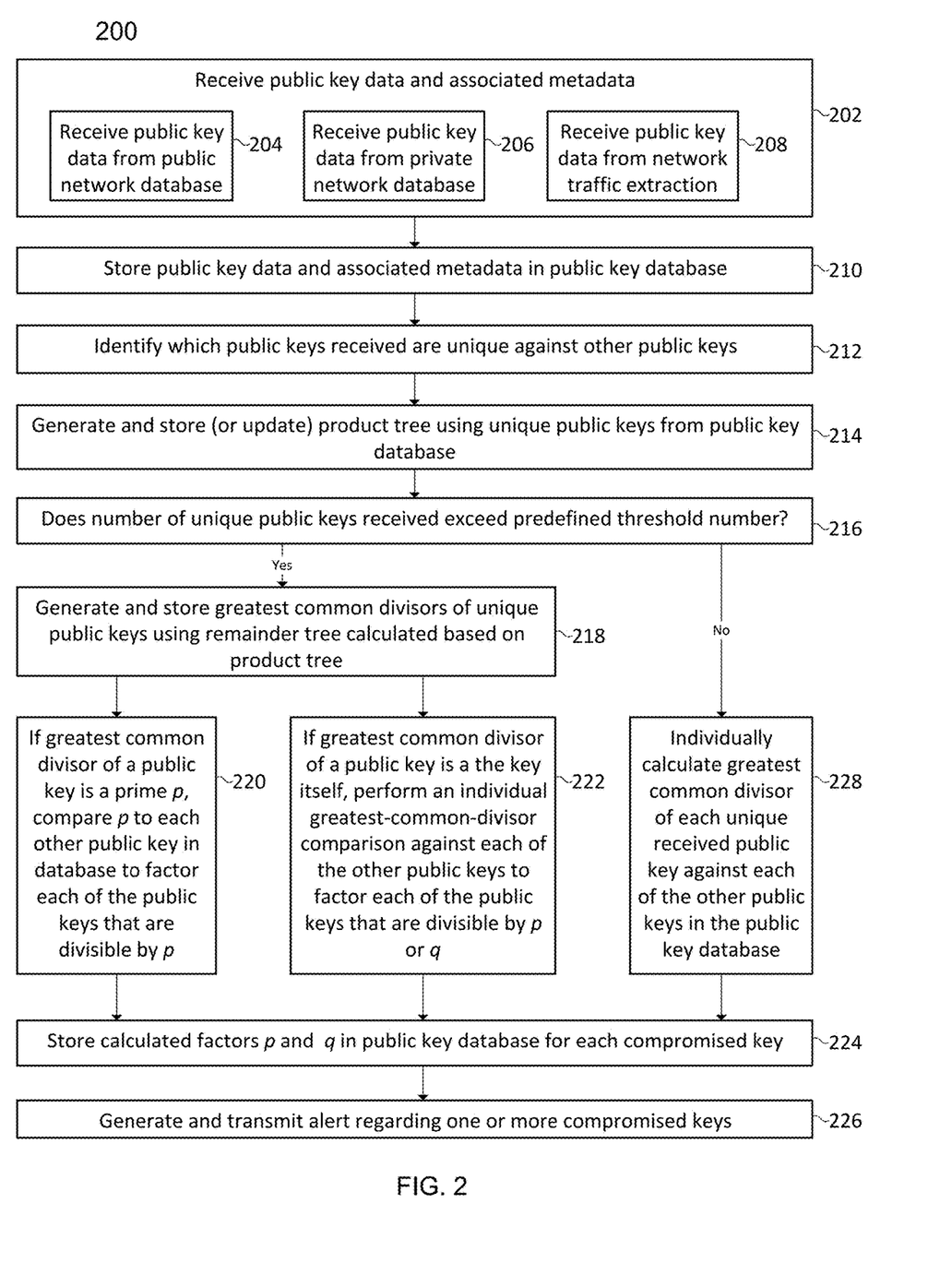
FIG. 2 shows a flow diagram depicting a method for detecting compromised public encryption keys in accordance with some embodiments.

Below, FIGS. 1 and 2 provide a description of exemplary systems and methods for performing the techniques for detecting compromised public encryption keys, as disclosed herein. FIG. 2 may be specifically applicable to detecting vulnerable RSA public keys.

FIG. 1 depicts a computer system 100, in accordance with some embodiments, that is configured to perform one or more software processes that, when executed, provide one or more aspects of the disclosed embodiments. FIG. 1 is not intended to be limiting to the disclosed embodiment as the components used to implement the processes and features disclosed herein may vary.

As shown in FIG. 1, in some embodiments, system 100 may comprise public network database 110, private network database 120, network traffic data source 130, cryptographic information processing computer 140, and key comparison database 150. As explained in further detail below, cryptographic information processing computer 140 may receive cryptographic information such as public encryption keys and associated metadata from one or more of public network database 110, private network database 120, and network traffic data source 130. Cryptographic information processing computer 140 may then perform one or more calculations, to process and format the data, and metadata to store data to key comparison database 150, such that key comparison database 150 may be used to determine whether any encryption key is vulnerable to being compromised based on any of the encryption keys included in the received cryptographic information.

In some embodiments, public network database 110 may be any database or data source associated with a public network or a wide-area network, such as the internet, wherein the database includes (or the data source provides) cryptographic information with or without associated metadata. In some embodiments, public network database 110 may be a database that periodically scours the public internet to search for all publicly available public encryption keys (e.g., RSA public keys) and or digital signatures, and that stores the public keys and/or digital signatures (along with associated metadata) to be downloaded by users who access database 110 via the internet. For example, public network database 110 may, in some embodiments, be the database of public key encryption data available via Censys.io, which provides TLS certificate data taken from the internet. In some embodiments, public network database 110 may provide metadata associated with the encryption information; metadata may include IP address, source type, associated website type, associated operating system, associated firmware, (e.g., model number of associated firmware), a time at which a certificate or key or signature was generated, a time at which a certificate or key or signature was collected, or the like. In some embodiments, cryptographic information stored on public network database 110 may be in JSON file format, and may be compressed using the 1z4 compression algorithm.

In some embodiments, public network database 110 may be communicatively coupled by any one or more public or private electronic communication networks with cryptographic information processing computer 140. Communicative coupling may include permanent, temporary, or transient connection or communication by any one or more communication mediums, including being configured to send or receive data to one another via network communication, wireless communication, and/or transfer by physical electronic storage media.

In some embodiments, private network database 120 may be any database or data source associated with a private network or a local-area network, wherein the database includes (or the data source provides) cryptographic information with or without associated metadata. In some embodiments, private network database 120 may be associated with a corporate network, a university network, a governmental network, a laboratory network, a medical institution network, a military network, or the like. In some embodiments, private network database 120 may be a database that periodically scours all or part of one or more associated private networks to search for all public keys and/or digital signature data used within the network and that stores the keys and/or digital signature data along with associated metadata. In some embodiments, private network database 120 may be manually populated by administrators of the network. In some embodiments, cryptographic information stored on private network database 120 may be in JSON file format, and may be compressed using the 1z4 compression algorithm, or may alternately be in XML, or SQL string format.

In some embodiments, private network database 120 may provide metadata associated with the encryption information; metadata may include any of the metadata discussed above with reference to public network database 110, as well as additional metadata. For example, access to private network databases may in some embodiments allow access to more sensitive and more valuable metadata than access to public network databases; in one example, access to a private network database and/or private network source of cryptographic information may allow a user or system to gather information regarding what random-number-generation protocols and/or techniques were used in creating the cryptographic information, which may, as discussed below, be useful in determining the nature and/or extent of a potential vulnerability if one or more keys is determined to be compromised.

In some embodiments, private network database 120 may be communicatively coupled by any one or more public or private electronic communication networks with cryptographic information processing computer 140.

In some embodiments, network traffic data source 130 may be any hardware and/or software system configured to monitor network traffic and to extract cryptographic information from that traffic. For example, network traffic data source 130 may be any network traffic monitoring tool such as a gateway, firewall, router, switch, or the like that is configured to monitor traffic transmitted to and/or from one or more devices on a network. While monitoring the traffic, network traffic data source 130 may be configured to extract cryptographic information such as signing certificates, public RSA keys, and/or digital signatures from the traffic. Network traffic data source 130 may be further configured to extract and/or generate metadata regarding the extracted cryptographic information, including any of the metadata discussed above, as well as metadata regarding the time at which the cryptographic information was intercepted/extracted. Network traffic data source 130 may be further configured to store the cryptographic information and/or associated metadata locally, either transiently or durably, and to transmit the data to cryptographic information processing computer 140. In some embodiments, network traffic data source 130 may transmit individual pieces of cryptographic information (e.g., single RSA keys, single digital signatures) in response to their being extracted; in some embodiments, network traffic data source 130 may store one or more pieces of cryptographic information following their extraction and may then transmit them after a predefined time period, at a predetermined time, or when more than a predetermined amount have built up in local storage. In some embodiments, cryptographic information extracted by network traffic data source 130 may be provided in any suitable file format, including as one or more strings of encoded data, and/or including any of the file formats discussed above.

In some embodiments, network traffic data source 130 may be communicatively coupled by any one or more public or private electronic communication networks with cryptographic information processing computer 140.

In some embodiments, cryptographic information processing computer 140 may include server-side computing components as well as client-side computing components. The specific elements shown in FIG. 1 may, in some embodiments, be included in a server-side computer and/or may, in some embodiments, be included in a client-side computer. In some embodiments, cryptographic information processing computer 140 may include server-side components and client-side components that are in communication with one another via one or more instances of communication device 104, which may, for example, enable communication of server-side components and client-side components over a network connection.

In some embodiments, some or all components of cryptographic information processing computer 140 may be part of a distributed computing system (e.g., a cloud computing system). In some embodiments of the techniques disclosed herein, for example, storage 110 may be storage provisioned by a cloud computing system, such that a user may send instructions to the cloud computing system over one or more network connections, and the cloud computing system may execute the instructions in order to leverage the cloud computing components in accordance with the instructions. In some embodiments, cloud computing systems may be configured to be capable of executing the same or similar program code in the same programming languages as other systems (e.g., servers, personal computers, laptops, etc.) as discussed herein.

Processor 102 may be any one or more of any suitable type of computer processors capable of communicating with the other components of cryptographic information processing computer 140 in order to execute computer-readable instructions and to cause cryptographic information processing computer 140 to carry out actions in accordance with the instructions. For example, processor 100 may access a computer program (e.g., software 112) that may be stored on storage 110 and execute the program to cause the system to perform various actions in accordance with the program. In some embodiments, a computer program or other instructions executed by processor 102 may be stored on any transitory or non-transitory computer-readable storage medium readable by processor 102.

In some embodiments, processor 102 may include one or more known processing devices, such as a microprocessor from the Pentium™ family manufactured by Intel™ or the Turion™ family manufactured by AMD™. Processor 102 may include a single core or multiple core processor system that provides the ability to perform parallel processes simultaneously. For example, processing unit 111a may include a single core processor that is configured with virtual processing technologies known to those skilled in the art. In certain embodiments, processor 102 may use logical processors to simultaneously execute and control multiple processes. The one or more processors in processor 102 may implement virtual machine technologies, or other similar known technologies, to provide the ability to execute, control, run, manipulate, store, etc., multiple software processes, applications, programs, etc. In another embodiment, processor 102 may include a multiple-core processor arrangement (e.g., dual or quad core) that is configured to provide parallel processing functionalities to allow cryptographic information processing computer 140 to execute multiple processes simultaneously. Other types of processor arrangements, such as those used in Cray supercomputers, could be implemented to provide for the capabilities disclosed herein.

Communication device 104 may include any suitable device capable of transmitting and receiving signals over a network, such as a network interface chip or card. Cryptographic information processing computer 140 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Input device 106 may be any suitable device that provides input, such as a touchscreen or monitor, keyboard, mouse, button or key or other actuatable input mechanism, microphone, and/or voice-recognition device, gyroscope, camera, or IR sensor. Output device 108 may be any suitable device that provides output, such as a touchscreen, monitor, printer, disk drive, light, speaker, or haptic output device. Input device 106 and/or output device 108 may include components configured to send and/or receive information between components of cryptographic information processing computer 140 or external to cryptographic information processing computer 140.

Storage 110 can be any suitable device the provides storage, such as an electrical, magnetic or optical memory including a RAM, cache, hard drive, CD-ROM drive, tape drive, or removable storage disk. In some embodiments, storage 110 may include instructions that, when executed by one or more processors of processor 102, perform one or more processes consistent with the functionalities disclosed herein. Storage 110 may also include any combination of one or more databases controlled by memory controller devices (e.g., server(s), etc.) or software, such as document management systems, Microsoft SQL databases, SharePoint databases, Oracle™ databases, Sybase™ databases, or other relational databases. In some embodiments, storage 110 may contain or be communicatively coupled to any one or more of the databases discussed herein.

In some embodiments, instructions, application programs, etc., may be stored in an external storage or available from a memory over a public or private network to which cryptographic information processing computer 140 is communicatively coupled. The one or more processors in processor 102 may execute one or more programs located remotely from cryptographic information processing computer 140 and/or system 100. For example, cryptographic information processing computer 140 may access one or more remote programs, that, when executed, perform functions related to disclosed embodiments. Storage 110 may include one or more memory devices that store data and instructions used to perform one or more features of the disclosed embodiments.

Software 112, which may be stored in storage 110 and executed by processor 102, may include, for example, the programming that embodies the functionality of the methods, techniques, and other aspects of the present disclosure (e.g., as embodied in the computers, servers, and devices as described above). In some embodiments, software 112 may include a combination of servers, such as application servers and database servers.

Methods, systems, and articles of manufacture consistent with disclosed embodiments are not limited to separate programs or computers configured to perform dedicated tasks. For example, cryptographic information processing computer 140 may include storage that may include one or more programs to perform one or more functions for receiving, comparing, analyzing, and storing information regarding cryptographic information such as encryption keys and/or digital signatures, as well as for generating and transmitting outputs in accordance with information received and determinations performed.

Software 112 can also be stored and/or transported within any computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 110, that can contain or store programming for use by or in connection with an instruction execution system, apparatus, or device.

Software 112 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

Cryptographic information processing computer 140 can implement any one or more operating systems suitable for operating on the network. Software 112 can be written in any one or more suitable programming languages, such as C, C++, Java, or Python. In various embodiments, application software embodying the functionality of the present disclosure can be deployed in different configurations, such as in a client/server arrangement or through a Web browser as a Web-based application or Web service, for example.

In some embodiments, one or more of public network database 110, private network database 120, network traffic data source 130, and key comparison database 150 may be communicatively coupled by a public or private electronic communication network with cryptographic information processing computer 140. Cryptographic information processing computer 140 may be communicatively connected to one or more memory devices (e.g., databases (including but not limited to private database 112 and public database 114)) locally or through a public or private network. The remote memory devices may be configured to store information and may be accessed and/or managed by cryptographic information processing computer 140. By way of example, the remote memory devices may be document management systems, Microsoft SQL databases, SharePoint databases, Oracle™ databases, Sybase™ databases, or other relational databases. Systems and methods of disclosed embodiments, however, are not limited to separate databases or even to the use of a database.

In some embodiments, key comparison database 150 may be any database communicatively coupled to cryptographic information, processing computer 140, and configured to store information regarding key comparisons and/or comparisons of other cryptographic data and associated metadata received and processed by cryptographic information processing computer 140. Cryptographic information processing computer 140 may build and store organized indexes, lists, tables, or the like on key comparison database 150, which may include any storage medium of system 100. In some embodiments, key comparison database 150 may be communicatively coupled by any one or more public or private electronic communication networks with cryptographic information processing computer 140.

As described below, key comparison database 150 may be configured such that it is an organized database to which cryptographic information processing computer may store data, regarding received cryptographic information and metadata and comparisons of the received cryptographic information; and from which cryptographic information processing computer may read data regarding the comparisons of cryptographic information, in order to determine when to generate alerts regarding vulnerable cryptographic information and to whom or to what systems to transmit those alerts. In some embodiments, as described in detail below, key comparison database 150 may maintain a table or list of all received cryptographic information (e.g., all received public keys and/or digital signatures) and may also maintain a separate table or list or a distinct column of the aforementioned table, indicating unique pieces of the received cryptographic information (e.g., only unique received public keys). In some embodiments, key comparison database 150 may store data retrieved from any one or more of the data sources discussed above in an SQL database.

Detecting Compromised Public Encryption Keys

FIG. 2 shows a flow diagram depicting a method for detecting compromised RSA public keys, in accordance with some embodiments. While some portions of method 200 may be applicable to keys in protocols other than RSA, the example of method 200 is made with reference to the RSA protocol; accordingly, for the purpose of this non-limiting example of method 200, which may have applicability in some respects outside the RSA protocol, the terms "public key," "key," "encryption key," and "RSA key" may be understood to refer to RSA public keys used for method 200. The method 200 may be performed by a system such as system 100 described above with reference to FIG. 1 or such as cryptographic information processing computer 140 as described above with reference to FIG. 1. In the described embodiments, certain method steps are performed by certain system components; however, in other embodiments, each of the method steps may be performed by any one or more of the other components described herein.

The methods described herein, including exemplary method 200, may enable computationally efficient techniques for determining whether an encryption key or other cryptographic information is vulnerable to being compromised. The methods may enable using a batch-comparison technique to build and/or update a product tree using encryption key data, calculating a remainder tree using the product tree, and thereby efficiently updating a database to track which encryption keys are vulnerable to being factored and exploited in light of at least one other known encryption key. While method 200 is described with reference to public encryption keys (public keys), one or more parts of the method may be similarly applicable to other kinds of encryption data that relies on random number generation systems, such as digital signatures.

At block 202, in some embodiments, the system may receive public key data and associated metadata. The system may receive public key data and associated metadata in any suitable file format. For example, the system may receive public key data in the form of a digital certificate, and the system may receive certificate data issued by a certificate authority for communications using certificate-based encryption. In some embodiments, the system may be configured to passively receive or accept the data, or to actively request and/or retrieve the data. In some embodiments, the system may be configured to automatically request, retrieve, or extract the data from any one or more data sources in accordance with one or more predefined conditions, including a network communication event being detected, a predetermined time period elapsing, a predetermined time arriving, or any other suitable predetermined condition being determined to have been met. The certificate data may then be serialized in order to extract specific elements of cryptographic information from the certificate, such as the public encryption key (also called the "public key").

The serialization of the certificate or other encryption data received may also include the extraction of metadata associated with the one or more public keys, including any or all of the metadata discussed above. Metadata received along with or extracted from encryption data may be associated with one or more of the individual public keys included in the encryption data. In some embodiments, metadata associated with one or more of the RSA public keys may be received from a distinct source as compared to the public key data itself, such as when metadata is manually input by a user of the system.

In the example of FIG. 1, cryptographic information processing computer 140 may receive public key data and associated metadata from any outside source. In some embodiments, the data may be transmitted by network communication, may be transmitted by physical storage media, or may be manually input by a user.

At block 204, in some embodiments, receiving public key data and associated data may include receiving the public key data and/or associated metadata from a public network database. At block 206, in some embodiments, receiving public key data and associated data may include receiving the public key data and/or associated metadata from a private network database. At block 208, in some embodiments, receiving public key data and associated data may include receiving the public key data and/or associated metadata from network traffic extraction.

In some embodiments, the public network database may share any one or more of the characteristics of public network database 110 described above with respect to FIG. 1; the private network database may share any one or more of the characteristics of private network database 120 described above with respect to FIG. 1; and network traffic extraction may be performed by a system or tool sharing any one or more of the characteristics of network traffic data source 130 described above with respect to FIG. 1.

In some embodiments, data received from public network databases and/or private network databases may provide a plurality of public keys at once; such as thousands, millions, or tens of millions or more public keys in one batch. In some embodiments, data received from network traffic extraction may provide smaller numbers of keys at once; such as fewer than 100 keys per batch, fewer than 10 keys per batch, or one key at a time. As described below, in some embodiments, the system may process larger batches of public keys in a different manner than it processes smaller batches of public keys.

In some embodiments, receiving data from live streaming network traffic may allow for real-time monitoring of new keys as they appear in network traffic, such that potential vulnerabilities may be detected quickly and potentially before the keys are integrated into large public databases. It may further enable new keys to be quickly compared, both against other keys taken from a closed network database or private network database and against keys taken from a public network database.

Finally, in some embodiments, new keys (and associated metadata) may be input into or received by the system, wherein the new keys have not been used in network communication (or in public network communication) at all. Thus, a potential new key may be compared against one or more large databases, keys from live traffic, and any other keys known to a system before the new key is made operational, thus providing reassurance that a key will not be operationalized if there is a known reason to believe that the key may be vulnerable.

At block 210, in some embodiments, the system may store the public key data and associated metadata in a public key database. For example, cryptographic information processing computer 140 may store some or all of the public key data and associated metadata in key comparison database 150. In some embodiments, when public key data is received by the system, all received public keys may be inserted into a database that stores the information constituting the key itself and associates that information with relevant metadata. In some embodiments, the information may be stored in an index, table, or any other suitable data structure. In some embodiments, an exhaustive list of every public key received by the system, including any duplicate public keys received, may be stored in the database. In some embodiments, older public key data may be deleted and replaced by the newly received public key data. In some embodiments, metadata identifying one or more of the public keys in the public key data may be used to determine whether or not to store the public key in the public key database; for example, a system may be configured such that a duplicate public key received from different sources (e.g., corresponding to different equipment or systems) may be stored to the database twice, while a duplicate public key received by the system twice from the exact same source (e.g., having some or all matching metadata) may not be stored to the database twice.

At block 212, in some embodiments, the system may identify which public keys received are unique against other public keys known to the system. For example, the system may determine which newly-received public keys are unique against other public keys in the same batch of data, against other public keys in other simultaneously-received data batches, and other public keys previously known to the system (e.g., already stored in the database). In some embodiments, the system may generate and store one or more data structures, such as in the public key database, representing which of the public keys are unique against all other public keys. In some embodiments, the system may generate a distinct or separate list or database containing only the unique public keys; in some embodiments, the system may store data to a field in a data structure or to a column in a table that indicates whether or not the public key is unique against all other public keys in the database.

In some embodiments, determining whether each newly-received public key is unique against all other public keys known to the system may be accomplished by using a hash of the public key. For example, because public keys may be extremely large numbers (e.g., numbers having on the order of 800, 900, or 1000 digits or more), even performing a direct comparison of the public keys to check for duplicates against all other public keys in the system may be computationally infeasible, especially when the body of public keys being analyzed by the system may be on the order of millions of keys, tens of millions of keys, or more. Thus, in order to drastically speed the process of identifying duplicate keys, each of the keys may be hashed in accordance with any suitably distributed hash function (e.g., SHA-512) and keys for which the generated hash does not match the generated hash for any other key may be determined to be unique. In some embodiments, keys generating matching hashes may be assumed to be duplicate keys, or the actual keys themselves may be checked to determine that the hash algorithm did not generate a false-positive match.

At block 214, in some embodiments the system may generate and store (or update) a product tree using the unique public keys from the public key database. In the example of FIG. 1, cryptographic information processing computer 140 may store the product tree on any storage or database associated with system 100, such as on key comparison database 150 or on storage 110.

After determining which of the received (and/or previously stored) keys are unique against all other keys known to the system, the system may undertake one or more techniques to compare the unique keys to one another to determine which keys may be vulnerable to being compromised. As described below, the system may perform either a batch-comparison technique or an individual key-by-key technique. As explained in further detail below, in accordance with the batch-comparison technique, a product tree may be built from the body of public keys, and a remainder tree may then be calculated based on that product tree, wherein the outputs from the remainder tree are determined to each be the greatest common divisors of one of the respective input public keys. The greatest common divisors may then be analyzed to factor the vulnerable public keys in the database.

On the other hand, the individualized key-by-key comparison technique may comprise comparing a received public key to each of the other public keys in the database in order to individually determine its greatest common divisor against the other public keys, without the use of a remainder tree. However, even when the individualized comparison technique is used, a previously-constructed product tree may nonetheless be updated in accordance with any new public keys received, such that the batch-comparison technique may be used more quickly and efficiently at a future time.

Thus, at block 214, after identifying any new public keys received, the system may generate and store a product tree. The product tree may be a data structure that uses each of the public keys as an input and calculates the overall combined product for the entire set of keys but also calculates and stores intermediate pair-wise products along the way. For example, each of the input public keys may be paired with one other input public key to form a first layer, and the product of each pair may be calculated with those products forming a second layer with half as many elements as the first layer. Each of the products in the second layer may then be paired with one of the other products in the second layer, and the product of each pair in the second layer may then be calculated, with those products forming a third layer with half as many elements as the second layer. This process of building layers may be continued until the final product of all of the public keys is calculated as the single element in a final layer of the product tree (with the final product forming the "trunk" of the tree). The product tree may be stored as a data structure such that each of the intermediate products and their position in the tree may be referenced and retrieved by the system as necessary.

In embodiments in which public keys are received by the system and the system has not previously created a product tree (or a new product tree is needed for another reason), the system may generate a product tree as described above. In some embodiments, however, the system may simply update an existing product tree. In order to update an existing product tree, one public key may be added to the end of the first layer, and its product with the adjacent public key may be calculated and stored as an additional element located at the end of the second layer. The product of that new product and the adjacent element in the second layer may then be calculated and stored as an additional element located at the end of the third layer, and so on. The product tree may thus be updated to incorporate one or more public keys at a time, without the need to rebuild the product tree from scratch.

After updating the product tree, which may be done whenever the system receives new unique public keys that are not already included in the product tree (or may be done periodically at predetermined times, predetermined intervals, or after receiving a predetermined number of new unique public keys), the system may then proceed to determine which technique should be used to calculate greatest common divisors of the new unique public keys received. As discussed above, the system may use either a batch-comparison technique or an individual comparison technique. In some embodiments, the batch-comparison technique may be used in all situations. In some embodiments, a user may manually input an instruction to use one technique or the other. In some embodiments, as discussed below, the system may determine which technique to use based, at least in part, on considerations regarding the number of new unique keys estimated or determined to be received.

At block 216, in some embodiments, the system may determine whether the number of unique public keys received exceeds a predefined threshold number. In some embodiments, the system may determine whether to use the batch-comparison or individualized comparison technique for one or more new unique public keys received based on one or more predefined conditions. In some embodiments, these conditions may relate to an estimated or determined number of new unique public keys received. The system may be configured in this way because the batch-comparison technique may be faster and more computationally efficient when processing a large number of new unique public keys, and because the individualized comparison technique may be faster and more computationally efficient when processing smaller numbers of new unique public keys. In fact, the individualized comparison technique may actually be computationally infeasible when the number of new unique public keys to be compared to each of the other keys in the database numbers in the millions or tens of millions or higher. Thus, when one or more new unique public keys are determined to be received, the system may estimate or precisely determine whether the number of keys is small or large.

In some embodiments, the system may use a data source of the new public keys as a proxy for estimating the number of keys received, such that when new keys are received after being extracted from network traffic, it may be assumed that the number of new keys received in this manner is small, and the individualized comparison technique may be used; on the other hand, when new keys are received from a database, it may be assumed that the number of new keys received in this manner is large, and the batch comparison technique may be used.

In some other embodiments, the system may determine the precise number of new unique public keys received, or may otherwise determine whether the number of new public keys received exceeds a predefined threshold number (as shown in block 216) and may use that distinction to determine whether to use the batch-comparison technique or the individualized comparison technique. That is, if the number of new unique keys received is equal to or less than the predefined threshold number, then the system may use the individualized comparison technique; if the number of new unique keys received is greater than the predefined threshold number, then the system may use the batch-comparison technique. In some embodiments, the system may further account for system resources available (e.g., RAM space available, speed of one or more system components, number of processors available, etc.) in determining which technique to use.

At block 218, in some embodiments, if it is determined at block 216 that the number of unique public keys does exceed the predefined threshold number, then the system may generate and store the greatest common divisors of each of the public keys received by using a remainder tree calculated based on the product tree. The remainder tree may be calculated, in some embodiments, by computing the entry of the previous row modulo the square of the corresponding entry in the product tree. One example of a technique using remainder trees may be found in: Daniel J. Bernstein, HOW TO FIND SMOOTH PARTS OF INTEGERS (2004), http://cr.yp.to/factorization/smoothparts-20040510.pdf. The output of the remainder tree may be a plurality of remainders at each layer, such that the final layer of the remainder tree contains a number of remainders equal to the number of inputs (e.g., public keys) used to create the product tree with each remainder corresponding to a specific one of the inputs (e.g., public keys).

For each remainder output by the remainder tree, the remainder may be provably equal to the greatest common divisor of the corresponding input public key against the other public keys used to build the product tree. Thus, because the product tree may be built based on all unique public keys known to the system, the remainder tree may output the greatest common divisor of each public key in the product tree as compared to any of the unique public keys known to the system.

As explained below, the output greatest common divisor corresponding to each public key may be analyzed to determine whether any one or more of the public keys is vulnerable to being compromised. For any public key in the database that is determined not to be factorable based on the other keys in the database, the output greatest common divisor may be 1, implying that no other key in the database shares a prime factor with that key. At blocks 220 and 222, as discussed below, two scenarios are discussed in which an output greatest common divisor may indicate that one or more keys may be compromised.

At block 220, in some embodiments, if a greatest common divisor of a public key is determined to be a prime p, where p is not equal to the public key itself, then the system may compare p to each public key in the database to factor each of the public keys that are divisible by p. By determining that a greatest common divisor of a specific public key is a prime p that is not equal to the public key itself, then it may be determined that p is one of the prime factors of the associated public key. First, the associated public key itself may be divided by p in order to yield q, thereby establishing both of its prime factors p and q and establishing that the key may be factored in light of the information available to the system and may therefore be vulnerable to exploitation. Furthermore, each of the other unique public keys in the database may then be compared to the prime p to determine which other key or keys are divisible by p, and to yield respective values for q for each of those keys as well. Thus, respective values for a prime factor q may be established for each of the two or more unique keys in the database that are factorable by the same value for p as indicated for the first public key.

At block 222, in some embodiments, if a greatest common divisor of a public key is determined to be the key itself, then the system may perform an individual greatest-common-divisor comparison against each of the other public keys to factor each of the public keys that are divisible by either p or q. By determining that a greatest common divisor of a specific public key is the public key itself, then it may be determined that one of two mathematical possibilities have caused this output. First, it may be that the key is identical to another key in the data set and that the greatest common divisor of those two keys is therefore their identical value itself. However, since the system may have already controlled against this possibility by detecting duplicate keys and using only unique keys to build the product tree, it may be determined that a greatest common divisor being equal to its corresponding key is not attributable to the key being a duplicate. Accordingly, the second explanation for a greatest common divisor being equal to its corresponding key is that the value for its first prime factor p is a factor of at least one other unique key in the data set, and the value for its second prime factor q is also a factor of at least one other unique key in the data set. That is, while both p and q may not be factors of a single other key in the data set (as the other key may in that case be identical to the key being analyzed), each p and q may be individually located in one or more of the other public keys in the data set. This may be referred to as a "double collision," in which both prime factors of a single public key are each determined to be a prime factor of other keys in the data set.

Based on this determination, that each p and q should be individually located in one or more of the other public keys in the data set, the system may determine which other public keys in the data set share either common factor p or q with the public key being analyzed. This may be done by performing an individual greatest-common divisor comparison against each of the other unique public keys in the database in order to factor each of the keys that are divisible by either p or q. By determining greatest common divisors of two or more pairs of public keys, each factorable key may be divided by the respective greatest common divisor to yield the other one of the two prime divisors. Thus, respective values for each p and q may be established for each of the two or more unique keys in the database that share one or more prime factor with the first public key (e.g., the public key being analyzed).

After determining respective values of p and q for two or more of the public keys in the database, the method may proceed to block 224.

At block 224, in some embodiments, the system may store calculated factors p and q in the public key database for each compromised key. Thus, in some embodiments, for any key for which a value for p or q has been calculated, in accordance with the techniques explained above, the system may store the calculated values to the database. In some embodiments, the public key database may include a column in a table or a field in a data structure configured to accept a determined value for p, and another similar column or field for q. In some embodiments, values for p and q may be stored in association with any unique key that was factorable in accordance with the techniques explained above, and may further be stored in association with any duplicate keys that correspond to any one of those unique keys.

At block 226, in some embodiments, the system may generate and transmit an alert regarding one or more compromised keys. In some embodiments, any key that has been factored in accordance with the information above may be determined to be compromised (or to be vulnerable to being compromised). In some embodiments, an alert may be generated and transmitted for each key that is determined to be compromised. In some embodiments, alerts may be transmitted to a user of the system listing or otherwise indicating any key (and associated metadata) that is determined to be compromised.

In some embodiments, a system may analyze metadata associated with one or more public keys determined to be compromised in order to determine the nature and/or extent of the alert that should be generated, and/or to determine to where or whom the alert should be transmitted. For example, in some embodiments, alerts may be transmitted to one or more source, party, organization, or network location indicated by metadata in the database as being associated with a compromised key.

In some embodiments, the metadata stored in the database may be analyzed to determine one or more groups of keys that are associated with a compromised key in accordance with one or more elements of metadata, and an alert may be generated and transmitted to a user or system in accordance with that determination. For example, if one or more keys that are determined to be compromised are attributable to a single device, system, organization, or RNG protocol, then alerts may be generated and transmitted concerning other keys also associated with those devices, systems, organizations, or RNG protocols. While those other keys may not be explicitly proven to be compromised, the system may determine that they are potentially vulnerable to one or more faults or defects that have caused the one or more compromised keys to be compromised, and that users or organizations associated with those other keys should accordingly be notified so that they may undertake preventative security measures.

Returning to block 216, it may be determined that the number of unique public keys does exceed the predefined threshold number, and the method may proceed to block 228 rather than to block 218. (As noted above, this determination may not impact the fact that the system may have already updated the product tree at block 214, such that the next time the batch-comparison method using the remainder tree is executed, computation time may be minimized by having already built the product tree.)

At block 228, in some embodiments, if it is determined at block 216 that the number of unique public keys does exceed the predefined threshold number, then the system may individually calculate the greatest common divisor of each unique received public key against each of the other public keys in the public key database. As discussed above, performing these greatest common divisor calculations on an individual basis may be more computationally efficient if the number of new unique public keys to be analyzed is small. In accordance with this individualized comparison, any key that yields a prime greatest common divisor p when compared to any one of the new keys may accordingly be divided by p to yield a value for q, and the new public key may also be divided by p to yield a value for q. The system may then proceed to block 224 and then to block 226, as described above.

Detecting Compromised Digital Signatures

In some embodiments, similar techniques as described above may be applied in whole or in part to detect private signing keys of digital signatures that are compromised or vulnerable to being compromised.

In some embodiments, a system such as system 100 may carry out such a technique by collecting and analyzing cryptographic data that includes digital signature data, in addition to or in place of RSA public keys. In some embodiments, the cryptographic data collected may include public signing key information, private signing key information, a message hash, and a random number. All of these components may be combined to form a secure digitally-signed message such that third parties may be able to validate the signature as genuine without compromising the privacy of the private signing key information.

While one party, organization, or system may regularly create multiple digital signatures using the same private signing key information, this practice may lead to the private signing key being computable based on the digitally-signed message, if duplicate random numbers are ever used in any two such messages.

Accordingly, a system may attempt to determine whether private signing keys are vulnerable to exploitation by gathering and storing a plurality of cryptographic data including digitally-signed message, and by extracting the respective digital signature used for each digitally signed message. In some embodiments, such cryptographic data may be received from public database, a private database, or a network traffic monitoring/extraction tool, similar to the data sources described above. The extracted digital signatures, which may be based on a random number and the private signing key, may be stored along with associated metadata in a database containing one or more data structures (e.g., lists, tables, indexes, etc.) that associate each digital signature with its metadata.

Then, the system may compare each of the collected digital signatures to every other digital signature collected, and may determine whether any random number is used for more than one digital signature in the database. If a random number has been used more than once in any of the collected information, and if the multiple uses of the number were also associated with the use of the same party, then the system may determine that the private signing key of that party is potentially vulnerable to being compromised based on being computed on the basis of the use of a duplicate random number in two different signed messages.

In some embodiments, in response to detecting multiple uses of the same random number by the same server or party (e.g., detecting two signatures having the same random number), the system may compute a value for the private signing key based on the two signatures using the same random number. The system may then generate a signature using the value for the private signing key that it calculated, and may test that the signature generated based on this value passes one or more protocols for validating the signature. If the signature is validated by the validation protocol, then it may be determined that the private signing key is in fact vulnerable to being compromised.

In accordance with this determination, the system may generate and transmit one or more alerts regarding the duplicate random number, the messages containing the duplicate random number, the party associated with the messages containing the duplicate random number, equipment/systems/RNG-protocols associated with the duplicate random number, or the like. The alerts may be transmitted to any one or more parties in a similar fashion as discussed above with respect to method 200.

Although the description herein uses terms first, second, etc. to describe various elements, these elements should not be limited by the terms. These terms are only used to distinguish one element from another.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

What is claimed is:

1. A system for determining whether an encryption key is vulnerable to being compromised, comprising:
   one or more microprocessors communicatively coupled to one or more data sources configured to provide cryptographic data, wherein the one or more microprocessors are configured to cause the system to:

receive the cryptographic data, wherein the cryptographic data comprises a public encryption key; and in response to receiving the cryptographic data:

extract and store the public encryption key along with associated metadata in a database;

determine a greatest common divisor of the extracted public encryption key against all other encryption keys in a plurality of unique encryption keys stored in the database;

in accordance with the determined greatest common divisor of the extracted public encryption key, determine that the extracted public encryption key is vulnerable to being compromised in accordance with any one of the other encryption keys in the plurality of unique encryption keys stored in the database; and in accordance with a determination that the extracted public encryption key is vulnerable to being compromised, generate and transmit an alert indicating that the extracted public encryption key is vulnerable to being compromised.

2. The system of claim 1, wherein determining the greatest common divisor of the extracted public encryption key comprises:

if a set of one or more predefined conditions is determined to be satisfied, individually comparing the extracted public encryption key against each of the other encryption keys in the plurality of unique encryption keys to determine a respective greatest common divisor of the extracted public encryption key for each of the other encryption keys in the plurality of unique encryption keys; and if the set of one or more predefined conditions is determined not to be satisfied, generating and storing a product tree based on the plurality of unique encryption keys, and generating and storing a remainder tree based on the product tree, to determine the greatest common divisor of the extracted public encryption key against the entire plurality of unique encryption keys.

3. The system of claim 2, wherein each of a plurality of remainders output from the remainder tree is a greatest common divisor of one of the unique encryption keys against the entire plurality of unique encryption keys.

4. The system of claim 2, wherein the set of one or more predefined conditions comprises that the cryptographic data is received from a predetermined source.

5. The system of claim 2, wherein the set of one or more predefined conditions comprises that the cryptographic data received comprises less than a predefined threshold number of unique public encryption keys that are not already stored in the database.

6. The system of claim 1, wherein determining that the extracted public encryption key is vulnerable to being compromised comprises factoring the extracted public encryption key into two prime factors, wherein one of the prime factors is the determined greatest common divisor and is also a factor of at least one of the other encryption keys in the plurality of unique encryption keys stored in the database.

7. The system of claim 6, wherein the other of the prime factors is also a factor of at least one of the other encryption keys in the plurality of unique encryption keys stored in the database.

8. The system of claim 6, wherein the one or more programs include instructions to store the two prime factors in the database in association with the extracted public encryption key.

9. The system of claim 6, wherein the one or more programs include instructions to store one of the prime factors in the database in association with one or more other encryption keys that are factorable by the prime factor.

10. The system of claim 9, wherein the one or more programs include instructions to store the other of the prime factors in the database in association with one or more other encryption keys that are factorable by the other of the prime factors.

11. The system of claim 1, wherein the alert is transmitted in accordance with the metadata stored in association with the extracted public encryption key.

12. The system of claim 1, wherein the one or more programs include instructions to, in accordance with the determination that the extracted public encryption key is vulnerable to being compromised, generate and transmit a second alert indicating that one of the other encryption keys in the plurality of unique encryption keys is vulnerable to being compromised, wherein the second alert is transmitted in accordance with metadata stored in association with the other encryption key.

13. The system of claim 1, wherein the one or more data sources communicatively coupled with the one or more microprocessors comprise a database of public encryption keys gathered from a public network.

14. The system of claim 1, wherein the one or more data sources communicatively coupled with the one or more microprocessors comprise a database of public encryption keys gathered from a private network.

15. The system of claim 1, wherein the one or more data sources communicatively coupled with the one or more microprocessors comprise a tool configured to extract public encryption keys from monitored network traffic in response to the traffic being detected by the tool.

16. The system of claim 1, wherein the extracted public encryption keys and the unique public encryption keys stored in the database comprise RSA public keys.

17. A method for determining whether an encryption key is vulnerable to being compromised, the method comprising:

at a system comprising one or more microprocessors communicatively coupled to a one or more data sources configured to provide cryptographic data:

receiving the cryptographic data, wherein the cryptographic data comprises a public encryption key; and in response to receiving the cryptographic data:

extracting and store the public encryption key along with associated metadata in a database;

determining a greatest common divisor of the extracted public encryption key against all other encryption keys in a plurality of unique encryption keys stored in the database;

in accordance with the determined greatest common divisor of the extracted public encryption key, determining that the extracted public encryption key is vulnerable to being compromised in accordance with any one of the other encryption keys in the plurality of unique encryption keys stored in the database; and in accordance with a determination that the extracted public encryption key is vulnerable to being compromised, generating and transmitting an alert indicating that the extracted public encryption key is vulnerable to being compromised.

18. A non-transitory computer-readable storage medium storing instructions for determining whether an encryption key is vulnerable to being compromised, the instructions configured to be executed by one or more microprocessors of a system comprising one or more data sources configured to provide cryptographic data, wherein execution of the instructions by the one or more microprocessors causes the system to:
- receive the cryptographic data, wherein the cryptographic data comprises a public encryption key; and
- in response to receiving the cryptographic data:
  - extract and store the public encryption key along with associated metadata in a database;
  - determine a greatest common divisor of the extracted public encryption key against all other encryption keys in a plurality of unique encryption keys stored in the database;
  - in accordance with the determined greatest common divisor of the extracted public encryption key, determine that the extracted public encryption key is vulnerable to being compromised in accordance with any one of the other encryption keys in the plurality of unique encryption keys stored in the database; and
  - in accordance with a determination that the extracted public encryption key is vulnerable to being compromised, generate and transmit an alert indicating that the extracted public encryption key is vulnerable to being compromised.

* * * * *